United States Patent Office 3,219,194
Patented Nov. 23, 1965

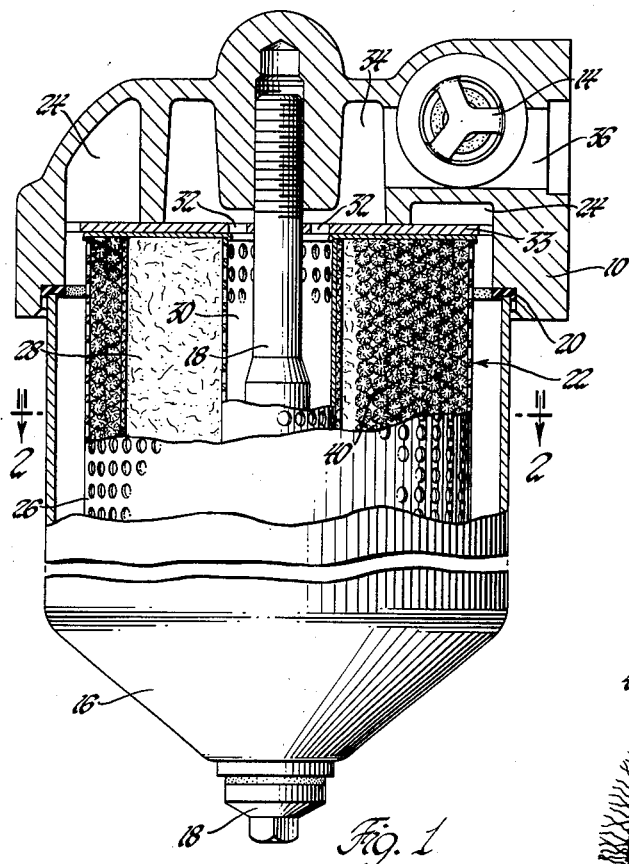

3,219,194
FILTER MASS OF FURRED NODULES
Karl Schwartzwalder, Holly, and George E. Suchy, Flint, Mich., assignors to General Motors Corporation, Detroit, Mich., a corporation of Delaware
Filed Jan. 16, 1963, Ser. No. 251,871
1 Claim. (Cl. 210—508)

This invention relates to filters and more particularly to a mass of filter material suitable for use in depth-type filters.

The present invention pertains to a mass for clarifying diverse forms of fluids. One form for which it is especially adapted is lubricating oil such as used in an automobile engine. In such oils, atmospheric dust and road dirt are carried into the oil with ventilation and combustion air. Casting sand mill scale from manufacturing as well as metallic fines from engine break-in and wear often are deposited in the oil. Lubricating oil deterioration products from natural breakdown or engine misuse, fuel combustion by-products, breakdown products of complex oil additives, coolant leakage deposits and other impurities should be filtered from the oil for the protection of engine parts and preferably without removing added and desired agents such as detergents present in oil. Another problem is the corrosive attack which occurs whenever an engine cylinder surface is cold enough to cause water to condense from the combustion gases. Products of combustion combine with the water imparting an acid reaction which leads to deterioration of the cylinder walls, pistons and piston rings.

Many filter structures have been proposed in the past to promote removal of impurities in fluids such as lubricating oil but all have had deficiencies. One of the most commonly used structures is that of pleated paper which depends on the size of the openings in the paper. In this case, the initial use of the filter is accompanied with poor filtration efficiency insofar as the removal of fines is concerned and this continues until a filter bed of dirt is built up on the paper and when this is accomplished so that the efficiency in fines is at a maximum, the filter element must be replaced as its resistance to flow of oil is too great. Depth-type filters are also used but in this case the filtration depends upon the density of the compacted material. When such materials are packed tightly, the filter has a short life. When the materials are loosely packed, the filtration is poor.

An object of the present invention is to provide an improved filter mass in which the useful life is prolonged with an accompanying maintenance of a high efficiency in its ability to clarify fluids such as lubricating oil. Another object is to provide a filter having the capacity of restraining the passage of fines without unduly restricting fluid flow thereby effecting a maximum of filter effectiveness and useful life.

A feature of the present invention is a mass of furred balls or nodules, each comprising a fluid permeable but dimensionally stable nodule and fibers adhering to its surface with a fluid permeable application of adhesive and those fibers forming a maze traversing voids between the nodules. Another feature is a mass of nodules in which fibers are attached to the surface of each nodule but extend outwardly therefrom. Another feature is a mass of furred balls each having a rigid nucleus with a diameter in the range of about 1/16 to 1/8 of an inch and the fibers protruding from each nucleus being such as to separate the latter in the mass. Another feature is a mass of furred nodules in which each nodule includes water absorptive material.

In the drawings:
FIGURE 1 is an elevation view of a filter including a filter mass in which the features of the present invention are embodied, the filter being shown on a mounting for supplying and withdrawing fluid and portions of the filter and mounting being broken away better to illustrate the construction;

FIGURE 2 is a sectional view looking in the direction of the arrows 2—2 in FIGURE 1;

FIGURE 3 is an enlarged view of a few furred nodules utilized in making up the filter mass of FIGURE 1 and showing their positions with relation to each other in the mass; and FIGURE 4 is a perspective view of a portion of a furred nodule showing its external covering construction, the view being greatly enlarged.

As one example, cotton linter balls are prepared by tumbling fibers of cotton in a rotating cylindrical container or on a disk at such speed and angle of inclination of the container or disk axis as to obtain a consistent rolling effect. During the rolling process, a solution of alcohol and resin is sprayed into the container. The cotton linter balls or nodules are readily formed in this manner and after these steps are completed, the nodules are placed into an oven and heated 300° F. (dependent upon the resin) in order to cure the resin and care being taken that the nodules remain discrete and flowable. Upon curing the resin and evaporating the solvent, a mass of rigid and discrete nodules of considerable dimensional stability and of desired controlled porosity is obtained. The degree of porosity desired is determined by the amount of resin used.

After the mass of rigid but porous or fluid permeable nodules obtained, cotton linters are tumbled in a rotating cylindrical container at a controlled speed and angle of inclination of the container axis. The nuclei or nodules with relatively smooth surfaces to be furred are then treated with a solvent containing a suitable resin and drained and are introduced into the rotating cylinder handling the fibers. Nodules are added to the tumbling fibers until the latter are well distributed on the surfaces of the nodules. Curing of the resin completes the process. The nodules do not adhere to each other as the added fibers separate them.

An alternative method may be employed for coating the nodules with fibers in which the fibers may be mixed with a dry resin powder and added to the nodules after the latter have been soaked in solvent only and drained. In this alternative process, the furred balls are cured in an oven set at a temperature appropriate for the resin. In this curing operation, tumbling is continued and adherence of the furred nodules to each other does not take place as the solvent is effective on the resin powder only immediate to the surface of each nodule.

The preferred diameters of the rigid nodules or nuclei should fall within the range of 1/16 to 1/8 of an inch approximately. This range of sizes influences the flow of fluid to be filtered by changing the size of the voids between the nodules. If the nodules are too large, the outside layer of fibers on each nodule will not provide a maze filling the voids available about that nodule and thereby loses filtering capacity. If too small, the mass loses filtering efficiency as the latter would depend more on the coating fibers alone and lose capacity for removing fines.

The adhesive joining the maze of fibers to the surface of each dimensionally stable nucleus 44 does not form a continuous coating around the latter. Also, the adhesive is not necessarily non-permeable but it obviously must be compatible with whatever fluid is to be filtered. A phenolic-formaldehyde resin is suitable in lubrication oil clarification use.

Examination of the balls or nodules after use in a filter shows that dirt particles have penetrated and are deposited within the structure of each nodule, within the voids between the nodules and on the surfaces of the nodules. The vast increase in surface area available for filtering is attained because of the great number of fibrils intimately exposed to the fluid and this increased surface area greatly increases the life expectancy of the filter element in which the mass is employed.

FIGURE 1 shows a support casting 10 having a conventional differential pressure operated bypass valve 14 and a filter casing 16 which is attachable to the support casting 10 by means of a bolt 18. The casing 16 is retained in tight relation with the casting 10 with the aid of a sealing gasket 20. A filter element is generally indicated at 22 and is so retained within the casing 16 that fluid entering from an annular chamber 24 of the casting 10 will surround the filter element 22 and be in position to penetrate the perforated cover 26 of the filter element and then pass through filter element 28 of the pleated paper variety and then through a central perforated tube 30 and pass upwardly by way of openings 32 in a plate 33 to an annular and inner chamber 34 in the casting 10. The purified oil may then flow out by way of a passage 36 to the engine. The valve 14 is so arranged that if the filter element 22 becomes plugged, the fluid pressure across the element 22 will rise and the valve will open and the filter element 22 will be bypassed by the fluid as is a well-known expedient.

The present invention is primarily concerned with the nature of the mass 40 of furred balls or nodules preferentially distributed as shown in FIGURE 2 between the perforated outer and inner cylindrical portions 22 and 30 of the filter element and between the diverging pleats of the filter paper element 28.

The nature of the balls or nodules of the mass 40 is best illustrated in the enlarged views of FIGURES 3 and 4. Each furred nodule 42 comprises a rigid nucleus or preliminarily formed nodule of fluid permeable material such as indicated at 44 in FIGURE 4. An exterior layer of fibers is indicated at 46 and this layer is attached to the hard nodule 44 by means of a thin and discontinuous surface deposit 48 of a suitable adhesive. If the entire structure of each nodule 42 is to have filtering capacity then its complete structure including the surface deposit 48 must be permeable to the fluid being clarified. The lengths of and number of the fibers 46 are such that the fibers will form a fluid permeable maze adequate substantially to fill the voids between the nodules of the mass as illustrated in FIGURE 3. The fibers to be used in forming the furry layer of each nodule may be composed of cotton linters, wool, synthetic replacements for cotton and wool, or natural cellulose fibers and mixtures of these may be employed. Inorganic fibers such as glass, alumina, mullite, barium titanate alone or in combination may also be used. The voids between nodules maintain flow capacity to give long filter life and the maze of adhesively applied fibers traps foreign matter despite the high rate of flow. The inner fibers 44 simultaneously extract dirt and the combined effect is much to be desired.

In realizing some of the advantages of using a maze of fibers upon the surface of each nodule as explained above, it has been found that ferrite or activated alumina or other materials which absorb water may be used in the nodule material 44. If water absorptive material is utilized, the combination is particularly advantageous in filtering gasoline and in the case of lubricants, the water absorptive media minimizes the formation of acid which corrodes engine parts.

In the forming of the rigid nucleus or nodules, prior to the application of the fiber maze, the invention permits the use of material such as magnetite or barium ferrite to impart magnetic properties for removing fine iron particles as well as any magnetic particles.

FIGURE 2 shows the combination of a pleated paper element surrounded by the mass of nodules herein considered. In this arrangement, the flow of clarified fluid may be greatly enhanced as the nodules between the pleats prevent premature blocking of the pores in the pleats by fines. Although such a combination is preferred, the mass of nodules of this invention may also advantageously be employed in a sock-type filter element such as that disclosed in the United States Patent No. 2,781,914, granted February 19, 1957, in the name of J. H. De Voe, or the parallel pleat type as disclosed in United States Patent No. 2,768,752, granted October 30, 1956.

In a combination filter unit having a resin impregnated but fluid permeable sheet 28 located on the downstream side of a mass of furred balls 40 as in FIGURES 1 and 2, it is obvious that the permeable structure of each rigid ball or nucleus 44 will retain fines before they reach the sheet 28. Those fines passing through the mass will be retained by the sheet but the net effect is that fluid flow will not be impeded by a clogged sheet as it would be if the sheet alone were depended upon to stop the fines. Large dirt particles will be caught by the maze of fibers 46 separating the nodules. It is also clear that the combination of furred balls and the permeable sheet provides a large filtering capacity and particularly when the furred balls are located between pleats of the sheet.

We claim:

A filter mass of furred and discrete balls, each of said balls consisting of a rigid and preliminarily formed nodule and a coating of fibers on the said nodule, sadi nodule having a stable diameter within the range of $\frac{1}{16}$ to $\frac{1}{8}$ of an inch approximately, the material of said nodule being fluid permeable and water absorptive, a surface deposit of adhesive retaining said coating on said nodule so that longitudinal portions of said fibers extend toward adjacent nodules of said mass, and the coatings of the nodules of said mass being of such thickness as to form a maze traversing all voids between the nodules of said mass.

References Cited by the Examiner
UNITED STATES PATENTS

| 2,116,537 | 5/1938 | Miller | 210—505 |
| 2,369,857 | 2/1945 | Russell et al. | 210—505 XR |
| 2,692,683 | 10/1954 | Mason | 210—508 XR |
| 2,746,608 | 5/1956 | Briggs | 210—508 XR |
| 2,893,561 | 7/1959 | Duzich | 210—504 XR |

FOREIGN PATENTS

| 158,197 | 7/1952 | Australia. |

JULIUS GREENWALD, *Primary Examiner.*

ALBERT T. MEYERS, *Examiner.*